United States Patent
Raybon et al.

(10) Patent No.: US 9,544,061 B2
(45) Date of Patent: Jan. 10, 2017

(54) SWITCHED OPTICAL RECEIVER

(71) Applicant: Alcatel-Lucent USA Inc., Murray Hill, NJ (US)

(72) Inventors: Gregory Raybon, Holmdel, NJ (US);
Peter J. Winzer, Aberdeen, NJ (US);
Roland Ryf, Aberdeen, NJ (US);
Nicolas Fontaine, Keyport, NJ (US);
Joon Ho Cho, Holmdel, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 10 days.

(21) Appl. No.: 14/703,559

(22) Filed: May 4, 2015

(65) Prior Publication Data

US 2016/0261351 A1 Sep. 8, 2016

Related U.S. Application Data

(60) Provisional application No. 62/128,338, filed on Mar. 4, 2015, provisional application No. 62/130,049, filed on Mar. 9, 2015.

(51) Int. Cl.
*H04B 10/60* (2013.01)
*G02B 6/28* (2006.01)
*G02B 6/02* (2006.01)

(52) U.S. Cl.
CPC ........... *H04B 10/60* (2013.01); *G02B 6/02042* (2013.01); *G02B 6/2861* (2013.01)

(58) Field of Classification Search
None
See application file for complete search history.

(56) References Cited

U.S. PATENT DOCUMENTS

| | | | |
|---|---|---|---|
| 8,358,939 B2 | 1/2013 | Komaki | |
| 8,582,974 B2 | 11/2013 | Ekkizogloy et al. | |
| 8,849,130 B2 | 9/2014 | Xie | |
| 8,908,809 B2 | 12/2014 | Zhou | |
| 2004/0096143 A1* | 5/2004 | Shpantzer | G02B 6/12004 385/16 |
| 2006/0120733 A1* | 6/2006 | Tucker | H04B 10/60 398/204 |
| 2012/0134667 A1* | 5/2012 | Westlund | H04B 10/64 398/25 |
| 2014/0112356 A1 | 4/2014 | Cheng | |
| 2014/0341594 A1 | 11/2014 | Olsson | |
| 2014/0356003 A1 | 12/2014 | Randel et al. | |

* cited by examiner

*Primary Examiner* — Darren E Wolf
(74) *Attorney, Agent, or Firm* — Andrew R. Ralston

(57) ABSTRACT

An apparatus, e.g. an optical oscilloscope, includes an optical receiver front end, including an optical device, and an optical delay. The receiver front end is configured to receive at least one input optical signal and produce by the optical device at least first and second output optical signals. The receiver front end is further configured to gate said at least one input optical signal or said at least first and second output optical signals. An optical combiner is configured to combine said at least first and second output optical signals, and the optical delay is located in an optical path of said first optical output signal between said optical receiver front end and the optical combiner. An optical detector is configured to receive a combined optical signal from said optical combiner and to produce therefrom an analog-electrical signal representative of the combined optical signal.

20 Claims, 7 Drawing Sheets

SWITCHED OPTICAL RECEIVER

CROSS-REFERENCE TO RELATED APPLICATIONS

This application claims the benefit of U.S. Provisional Application Ser. Nos. 62/128,338 filed on Mar. 4, 2015, and 62/130,049 filed on Mar. 9, 2015, each of which is commonly assigned with this application and incorporated herein by reference.

TECHNICAL FIELD

The present invention relates generally to the field of optical communications, and, more particularly, but not exclusively, to methods and apparatus useful for test and measurement of optical communications signals.

BACKGROUND

This section introduces aspects that may be helpful to facilitate a better understanding of the inventions. Accordingly, the statements of this section are to be read in this light and are not to be understood as admissions about what is in the prior art or what is not in the prior art. Any techniques or schemes described herein as existing or possible are presented as background for the present invention, but no admission is made thereby that these techniques and schemes were heretofore commercialized, or known to others besides the inventors.

The data rate of serial optical interfaces continues to increase and needs to increase to satisfy capacity requirements in the network. High-speed electrical interfaces are required to keep pace with the progress but the test and measurement instrument investments required to keep pace with high-speed systems research and development rise dramatically as well. Optical techniques combined with digital signal processing can provide lower cost alternatives. Today, the highest bandwidth for a commercially available CMOS analog-to-digital converter is approximately 30 GHz and samples at approximately 90 GS/s. On the other hand commercial electrical components are available to build coherent transponder prototypes between 72 and 100 Gbaud, thus requiring at least 50 GHz of bandwidth and 160 GS/s at the receive side ADC. Ultra-high bandwidth ADCs for coherent laboratory experiments are provided by real-time oscilloscopes. Oscilloscope vendors apply digital techniques to provide up to 100 GHz bandwidth and 240 GS/s from lower speed front end electronics and these specification are expected to progress to higher speeds and ultimately very high costs.

SUMMARY

The inventors disclose various apparatus and methods that may be beneficially applied to test and measurement of high-speed optical systems and signals. While such embodiments may be expected to provide improvements in performance and/or reduction of cost of such apparatus and methods, no particular result is a requirement of the present invention unless explicitly recited in a particular claim.

In one aspect, an apparatus, e.g. an optical oscilloscope, includes an optical receiver front end configured to receive at least one input optical signal and produce by an optical device at least first and second output optical signals. The receiver front end is further configured to gate the at least one input optical signal or the at least first and second output optical signals. An optical combiner is configured to combine the at least first and second output optical signals. An optical delay located in an optical path of the first optical output signal between the optical receiver front end and the optical combiner. An optical detector configured to receive a combined optical signal from the optical combiner and to produce therefrom an analog-electrical signal representative of the combined optical signal.

In some embodiments the optical device includes an optical hybrid configured to receive the at least one input optical signal and at least a second optical signal. The optical hybrid is configured to provide, by the first output optical signal, in-phase information of the at least one input optical signal, and to provide, by the second output optical signal, quadrature information of the at least one input optical signal. In some such embodiments the optical delay is configured to delay one of the in-phase information and the quadrature information relative to the other of the in-phase information and the quadrature information. In some embodiments the optical hybrid is implemented as a 3×3 coupler hybrid.

In some such embodiments a computing device is configured to temporally align a digital-electrical representation of the in-phase and quadrature information before computing characteristics of the received at least one optical signal therefrom. In some embodiments the computing device is further configured to align the in-phase and quadrature information using a pilot signal in the digital-electrical representation. In some embodiments the computing device is further configured to align the in-phase and quadrature information by correlating direct detection terms in the in-phase and quadrature information. In some embodiments the computing device is further configured to align the in-phase and quadrature information by performing a Fourier transform of the in-phase and quadrature information and performing a time shift in the frequency domain.

Some embodiments further comprise an optical switch configured to sample the at least one optical input signal during a predetermined sample window. Some embodiments further comprise an optical switch located in the optical path between the optical device and the optical combiner. The optical switch may be located between an output of the optical device and the optical delay. The optical switch may also be located between the optical delay and the optical combiner.

In some embodiments the optical delay comprises an optical fiber delay line. In some embodiments the optical delay is one of a pair of optical cores of a multicore fiber, wherein each pair of cores is configured to propagate a pair of corresponding outputs from the optical front end. In some embodiments the optical front end, optical delay and optical combiner are configured to produce a time-division multiplexed representation of a series of samples of in-phase and quadrature information of the received input signal, and a computing device is configured to temporally realign in-phase and quadrature information corresponding to same ones of the samples. In some embodiments the optical delay is one of a plurality of optical delays located between corresponding outputs of the optical device and the optical combiner, and the optical delay has a corresponding delay time that differs from others of the plurality of optical delays by about an integer multiple of a delay time difference.

In another aspect, methods are provided of manufacturing an apparatus, e.g. an optical oscilloscope, according to any of the apparatus embodiments described above.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Figure 1:
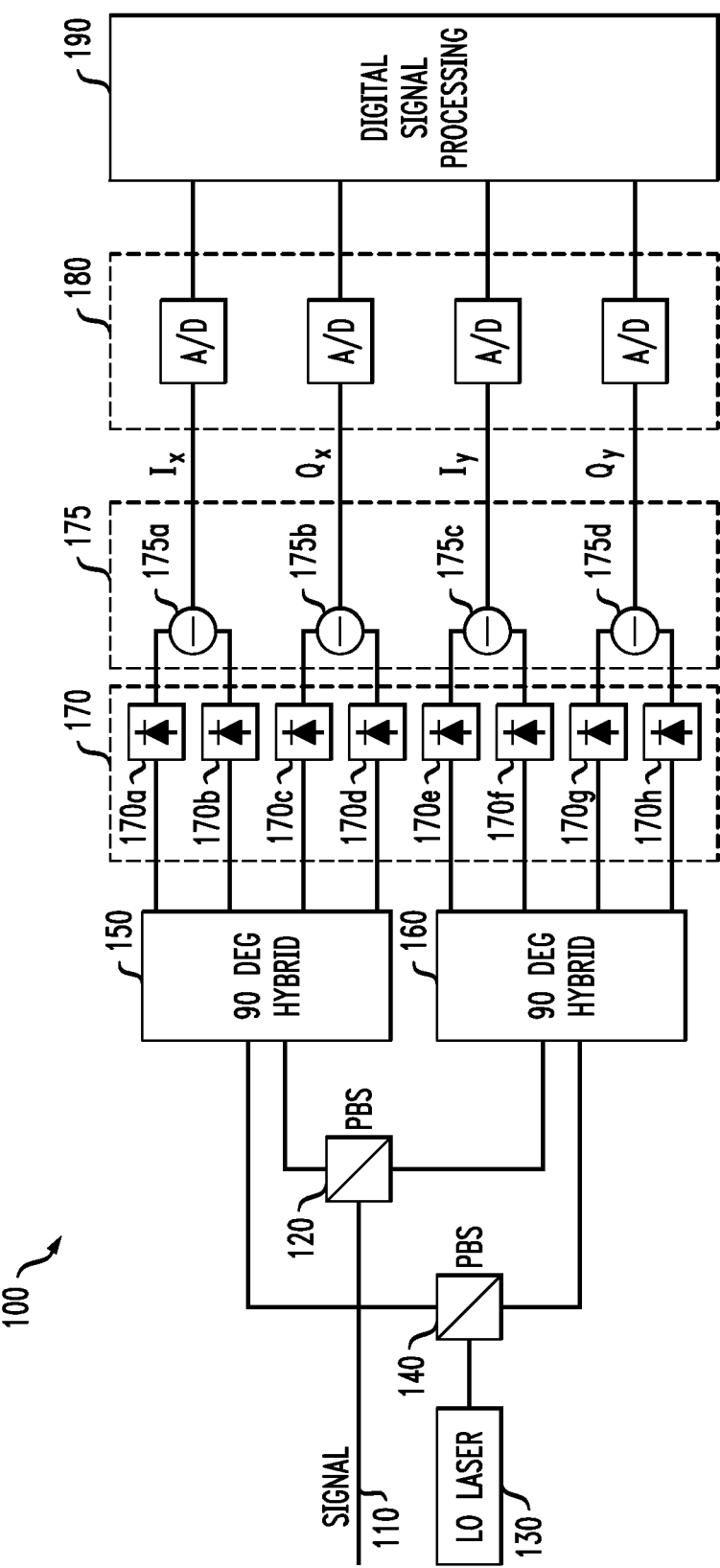
FIG. 1 illustrates a standard coherent receiver for polarization multiplexed signals.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Embodiments of apparatus and methods, useful for, e.g., high-speed optical signal test and measurement, are described herein, and are expected to be of particular advantage for reducing costs of such apparatus and methods compared to currently prevailing analogs. Typical coherent receiver test apparatus require at least four electronic analog to digital (A/D) conversions to process the full field of a polarization multiplexed (PM) m-ary quadrature amplitude modulated optical signal. Some implementations require six optical-to-electrical (OE) detectors and six A/D converters. Therefore, to upgrade a test and measurement system to higher speeds requires upgrades to receiver front-end components such as OE converters (photodiodes), AD converters and associated microwave components. These components are typically difficult and costly to manufacture, thus making it difficult to acquire and assemble the standard coherent receiver configuration at very high bandwidth. Embodiments described herein and otherwise within the scope of the disclosure reduce the number of OE and A/D converters at the receiver to a single OE converter and a single A/D converter by using optical techniques in combination with digital signal processing.

Embodiments described herein use optical switching to serially capture and assemble the required optical field information to reconstruct a PM quadrature amplitude modulated (QAM) optical signal on just a single optical detector, e.g. a balanced detector, and a single A/D converter. Any additional components needed to implement various embodiments, as compared to a conventional PM coherent optical receiver, may include readily available and inexpensive optical switches, optical delays, and optical couplers. Replacement of four expensive oscilloscope front-end receivers with a single receiver in a coherent detection test and measurement apparatus is heretofore unknown, and potentially provides a disruptive technical improvement to the high-speed test and measurement industry. Some described embodiments provide methods including such apparatus that improve on previously-published techniques to reduce the number of waveform captures in a space-division multiplexing experimental setup. (See, e.g. R. van Uden, et al., "Time domain multiplexed spatial division multiplexing receiver", Optics Express pp. 12668-12677 (2014), incorporated herein by reference)

FIG. 1 illustrates a schematic of a coherent optical receiver 100 that may be conventional. The receiver 100 receives a polarization multiplexed (PM) signal 110 into a polarization beam splitter (PBS) 120. A local oscillator 130, which also includes components at each of the received polarizations, is received into a PBS 140. Each of the PBS 120, 140 splits the respective received signals 110, 130, into an x-polarized component and a y-polarized component, where x and y are two nominally orthogonal polarizations. The x-polarized components are directed to a 90 degree optical hybrid 150, and the y-polarized components are directed to another optical hybrid 160. The hybrid 150 outputs four signals, $I_{xp}$, $Q_{xp}$, $I_{xn}$ and $Q_{xn}$. Similarly, the hybrid 160 outputs four signals, $I_{yp}$, $Q_{yp}$, $I_{yn}$ and $Q_{yn}$. Each set of hybrid outputs enters a balanced detector array 170, which converts the hybrid outputs to the electrical domain. A detector pair 170a, 170b converts the $I_{xp}/I_{yp}$ pair, with the difference of the converted outputs taken at a node 175a to produce $I_x$. Similarly, detector pairs 170c/170d, 170e/170f and 170g/170h produce $Q_x$, $I_y$ and $Q_y$. A/D converters 180 receive the I/Q values and convert each to a digital-electrical representation that is received by a digital signal processor (DSP) 190 for receiver processing.

Figure 2:
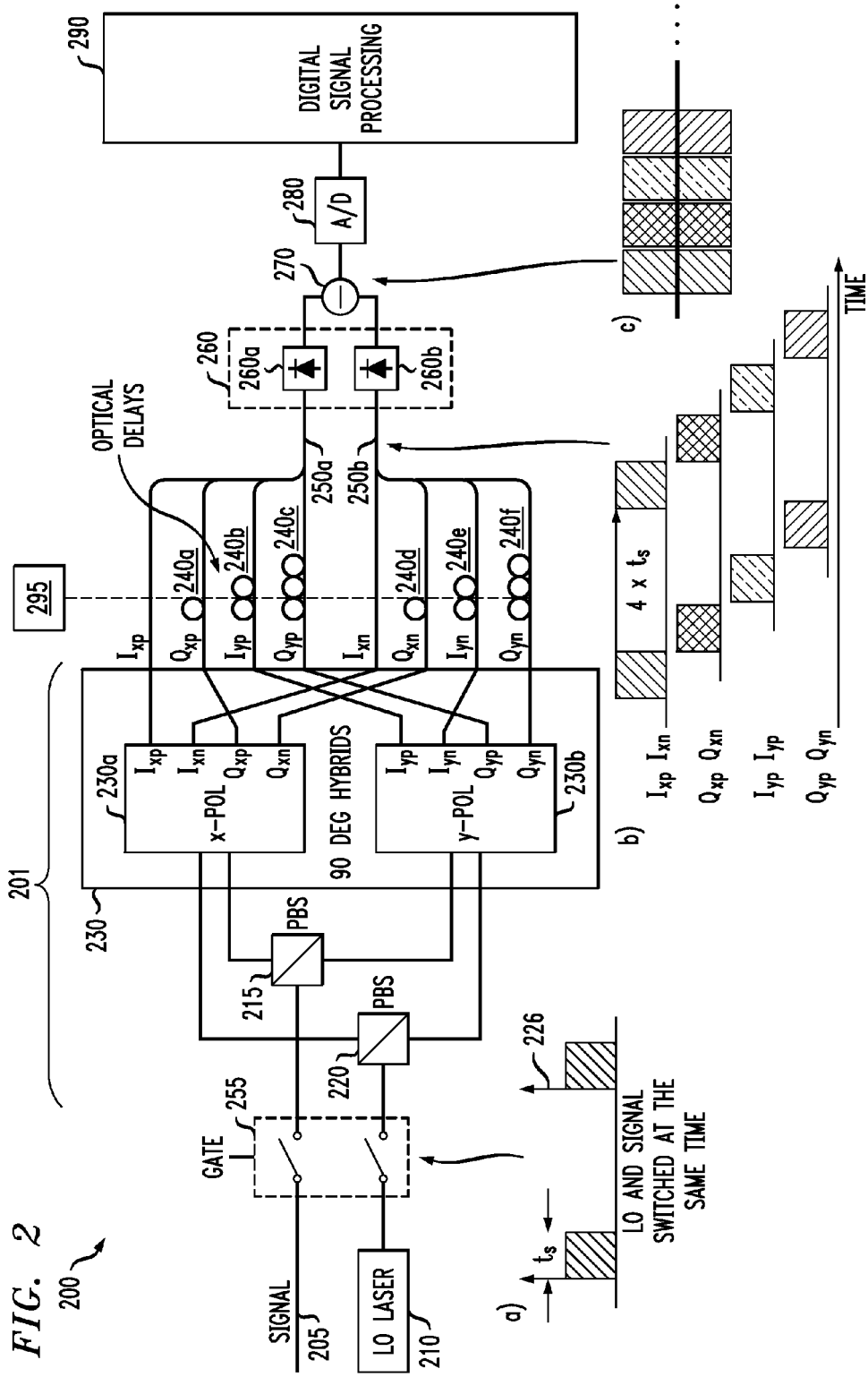
FIG. 2 illustrates an embodiment of a coherent receiver consistent with the disclosure that uses balanced detection and only two optical switches at the input.

FIG. 2 shows an optical receiver 200 according to one embodiment, based on, e.g. balanced detection and pre-hybrid switching. The receiver 200 includes an optical front end 201. The optical front end 201 operates on signals in the optical domain to determine quadrature components of the received optical signal. The optical front end 201 is described as including polarization-diversity, e.g. more than one polarization path. Embodiments that employ a single polarization path are encompassed by the description and the claims, unless otherwise noted.

The optical front end 201 includes switches 225, sometimes referred to as a gate or gates, and an optical device 230, shown in the present embodiment as an optical hybrid 225. In general, optical front end 201 is configured to accept at least one input optical signal, to output at least two, e.g. first and second, output optical signals, and to switch the at least one input optical signal or the at two output optical signals. As used herein, an "optical device" is a device that is configured to receive the at least input optical signal and to produce the at least two output optical signals based at least in part on the input optical signal. As used herein, "optical front end" is defined as an optical subsystem that includes one or more optical devices configured as defined, and an optical switch configured to controllably pass through, or to substantially block, the received at least one input optical signal, or the at least two output optical signals.

As described previously with respect to the conventional receiver 100, an input signal 205 and LO 210 each pass through a respective PBS 215, 220 to separate the respective polarization channels. In some embodiments the PBS 220 may be replaced by a 3-dB splitter. In contrast to the receiver 100, the switches 225 switch the input signal 205 and LO 210 at the same time before the PBS 215, 220 to form synchronized signal and LO bursts having a sample window of duration (or length) $t_s$ (inset a) spaced by at least $N \cdot t_s$ in order to eventually accommodate N full bursts, optionally with a guard interval between consecutive bursts. In the illustrated embodiment, N=4. In similar embodiments that use a single-polarization architecture, N=2 bursts may be used. As described further below, this feature allows the receiver 200 to act as the optical receiver of an optical oscilloscope. The length of the burst $t_s$ may be variable and may be determined by the desired number of samples to be captured by the oscilloscope. In a non-limiting example, if 1e6 samples are to be collected per polarization and quadrature for an architecture that uses N=4 bursts, and if the oscilloscope samples at 160 GS/s, one burst may be at least $t_s$=1e6/160e9=6.25 μs, with a period of at least about $4t_s$ for a repetition rate of at most about 40 kHz. The signal and LO bursts are mixed in hybrids 230a, 230b as previously described.

Each output of the hybrid 230a is delayed by about n-times the burst length $t_s$, wherein n=0, 1, 2, 3 . . . N−1 such that each different optical delay has a corresponding delay time that differs from others of the different optical delays by about an integer multiple of $t_s$. This integer multiple may be regarded as a delay time difference. Corresponding outputs of the hybrid 230 are delayed by about a same amount. Thus, in the illustrated embodiment $I_{xp}$ and $I_{xn}$ are not delayed, $Q_{xp}$ and $Q_{xn}$ are delayed $t_s$ by respective delays 240a, 240d, $I_{yp}$ and $I_{yn}$ are delayed $2t_s$ by respective delays 240b, 240e, and $Q_{yp}$ and $Q_{yn}$ are delayed $3t_s$ by respective delays 240c, 240f. In an illustrative embodiment the delays 240 are formed by, e.g., single-mode optical fiber delay lines. In the above example having a 40 kHz repetition rate, the delays 240a, 240d may be implemented using 6.25 μs·2c8 m/s=1.25 km of fiber, the delays 240b, 240e may be implemented using 2.5 km of fiber, and the delays 240c, 240f may be implemented using 3.75 km of fiber. In contrast to the conventional receiver 100, the signals $I_{xp}$, $Q_{xp}$, $I_{yp}$ and $Q_{yp}$ merge via a first combiner 250a, and $I_{xn}$, $Q_{xn}$, $I_{yn}$ and $Q_{yn}$ merge via a second combiner 250b. The output of the combiner 250a is converted to the electrical domain by one detector 260a of a balanced detector pair 260, and the output of the second combiner is converted by the other detector 260b of the detector pair 260. A difference node 270 combines the outputs of the detectors 260a and 260b, and an A/D converter 280 produces a digital-electrical representation of this signal for input to a processor 290, e.g. a DSP, for processing. As described further below, the processor 290 performs time-shifting and re-combining of the four serially captured signal constituents ($I_{sp}/I_{xn}$, $Q_{xp}/Q_{xn}$, $I_{yp}/I_{yn}$, $Q_{yp}/Q_{yn}$) into a single 4-waveform burst representative of the signal captured by a conventional sampling architecture such as, e.g. the configuration of FIG. 1. Note that differential attenuation, slight delay variations, or chromatic dispersion of each optical delay path can be compensated digitally by the processor 290. Note also that the present embodiment is described for the case of processing a polarization-multiplexed signal. In other embodiments the signal 205 may be a single-polarization signal, in which case only one polarization path may be used (N=2), resulting in $2t_s$ as the minimum burst spacing.

In some embodiments utilizing optical fiber delay lines, the delay fibers may be temperature stabilized. In some such embodiments the temperature of the fiber may be controlled, e.g. by a controller 295, to achieve a desired delay time of the corresponding optical delay. The controller 295 may control a voltage and/or a current to a heater (not shown) thermally coupled to each controlled optical delay. In some embodiments the delay time of an optical delay line may be indirectly determined by measuring the magnitude of the voltage and/or current used to control the delay time. In some other embodiments, the temperature of the fiber may be unstabilized, but measured via a temperature sensor. A temperature-calibrated delay value may then be applied as part of the algorithm performed by the processor 290 described below.

In some embodiments, not shown, single-ended detectors may be used instead of the detector pair 260. In such embodiments only one set of I/Q outputs from each hybrid 230 need be used, e.g. $I_{sp}/Q_{xp}$ and $I_{yp}/Q_{yp}$, still with N=4 for a burst spacing of $4t_s$.

In FIG. 2, inset a describes the gating of the input signal 205 to be characterized, and the LO 210, at the input to the receiver 200. The switches 225, controlled by a gate signal, connect the signals 205 and 210 respectively to the PBSs 215 and 220 for the sample window $t_s$ every $N \times t_s$, where N=4 in the illustrated embodiment. Inset b describes the signals at the combiners 250a and 250b. The $I_{xp}$ and $I_{xn}$ signals are undelayed and arrive first. The $Q_{xp}$ and $Q_{xn}$ signals are delayed by a single delay increment $t_s$ and arrive next, followed by the $I_{yp}$ and $I_{yn}$ signals at $2t_s$, and $Q_{yp}$ and $Q_{yn}$ at $3t_s$. At $4t_s$ another sequence of delayed signals begins. Inset c describes the signal resulting at the output of the summing node 270, in which the signals above the line represent the "p" indexed signals received via the detector 260a, and the signals below the line represent the "n" indexed signals received via the detector 260b. The combined signal includes components from both received polarization channels, with the sequence of received signal bursts repeating every period of $4t_s$. Thus, a repeating sequence of $I_x=I_{xp}-I_{xn}$, $Q_x=Q_{sp}-Q_{xn}$, $I_y=I_{yp}-I_{yn}$ and $Q_y=Q_{yp}-Q_{yn}$ results. The A/D converter 280 converts this sequence of values to the digital-electrical format for processing by the processor 290.

Figure 3:
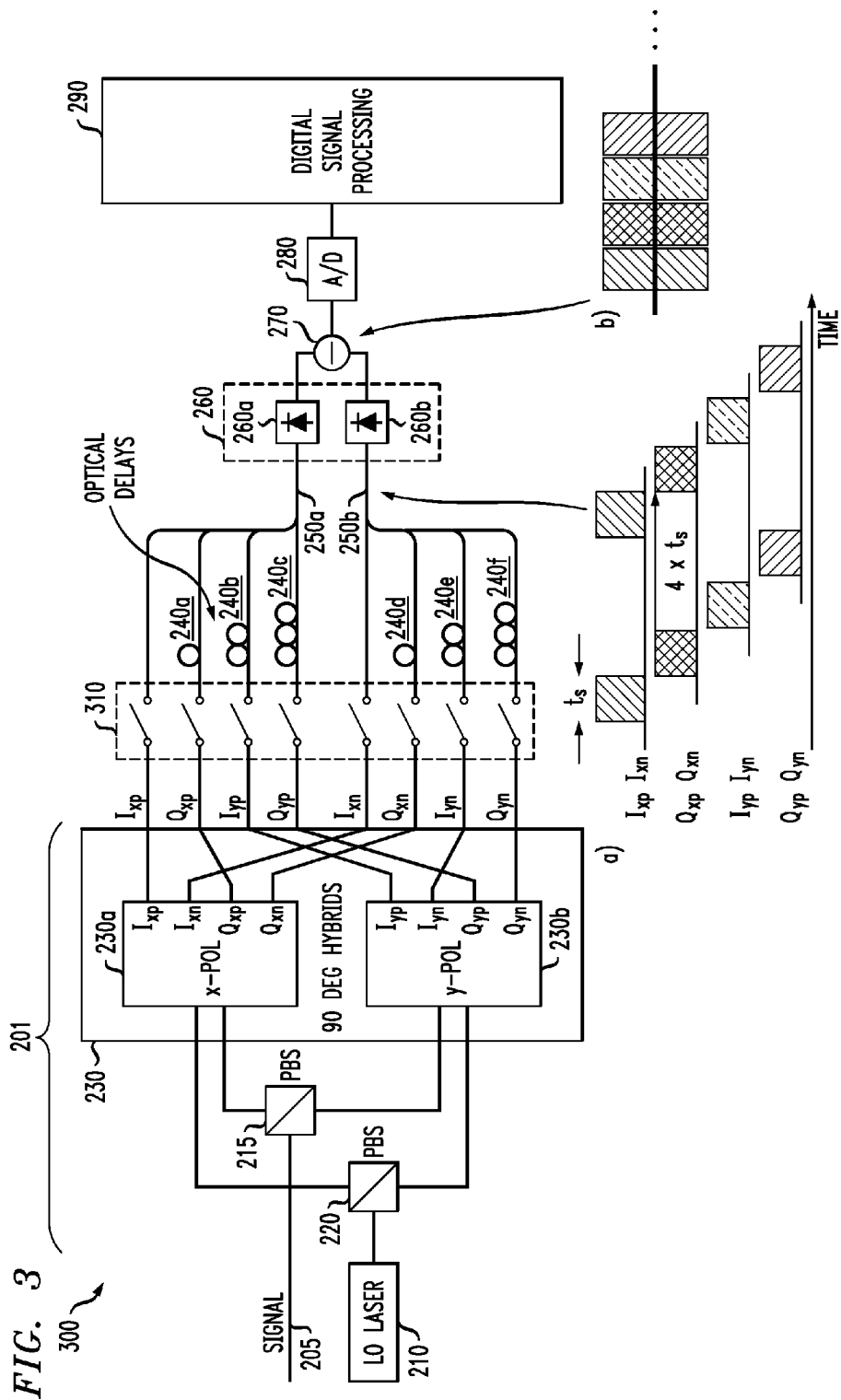
FIG. 3 illustrates another embodiment of a coherent receiver consistent with the disclosure that uses balanced detection and eight optical switches after 90 degree hybrids.

FIG. 3 illustrates an optical receiver 300 according to another embodiment, in which illustrated elements may be the same as like-numbered elements in FIG. 2. The receiver 300 includes a bank of eight optical switches 310 located between the hybrids 230 and the combiners 250a, 250b. In this configuration the switches 310 operate to gate the individual optical mixing components output by the hybrids 230. This configuration enables the signal and LO to mix in a non-pulsed manner. This avoids possible damage to optical components that can be caused when switching through these components high power optically amplified optical signals derived from the signal 205 and the LO 210. In some circumstances, however, the eight optical switches, as well as the associated drive electronics (not shown), may be considered disadvantageous, at least in terms of cost and/or complexity. Naturally, this scheme can also be implemented in a single-ended configuration, saving half the photodiodes and switches. In such embodiments only one set of I/Q outputs from each hybrid 230 need be used, e.g. $I_{xp}/Q_{xp}$ and $I_{yp}/Q_{yp}$. In the configuration of FIG. 3 the signals at the input to the balanced detector 260 (inset a) are as described for FIG. 2 (inset b), and the signals at the input to the A/D converter 280 (inset b) are as described for FIG. 2 (inset c). In some embodiments the optical delays 240a-240d may be located between the hybrid 230 and the switches 310. In such embodiments the optical front end 201 may be regarded as including the delays 240.

Referring to both FIGS. 2 and 3, in an example method implemented by the processor 290, a single captured waveform including at least one burst (e.g., in four-fold serial replication representing $I_x$, $Q_x$, $I_y$, and $Q_y$) is parsed in a first step into four individual data streams internal to the processor 290. In this context, parsing refers to the logical association of data received from the A/D converter 280 into streams representing I and Q for each receive polarization. Parsing may be performed based on, e.g. one or more of (i) electrical synchronization to a trigger signal (not shown) received by the processor 290, (ii) an optical pilot injected into the signal or LO optical fields at the switching stage, or (iii) digital correlation of the signals after detection. The trigger signal or optical pilot may be coincident, or nearly so, with a beginning of a burst, e.g. at the beginning of each burst as shown by pilot 226 in inset a of FIG. 2. Those skilled in the pertinent art will be familiar with details of such signal synchronization. Electrical synchronization, if used, may in turn be synchronized to the gate signal that controls the switches 225, e.g. the pilot 226. For embodiments using digital correlation, one or both of the electrical pilot and optical pilot may be omitted. The optical pilot, if used, may be provided via the local oscillator and/or the received signal, on any polarization channel or any wavelength, e.g., by inserting a dedicated optical pilot pulse using an optical coupler (not shown) or by inducing a characteristic fast switching transient to the existing optical signals through a separate optical switch (not shown) or through existing switches 225 or 310. The processor 290 may be incorporated into a device such as an oscilloscope, and the trigger signal may take the form of an oscilloscope trigger, strobe, or similar signal. The optical switches 225 (FIG. 2) and the optical switches 310 (FIG. 3) may be operated by switch-driving electronics (not shown) coupled to the trigger. The trigger signal may be synchronized with a switch drive signal of the driving electronics to provide a marker, e.g. the pilot 226, for the start of the first burst within the captured waveform. Each of the parsed streams may contain one or more copies of the burst (e.g. FIG. 2, inset c) or gated (e.g. FIG. 3, inset b) signal.

In a second step performed by the processor 290, each parsed data stream may be separately processed. The separate processing may include compensating for impairments specific to each parsed stream, such as chromatic dispersion arising from the fiber delays or stream-specific attenuation values. Then, in a third step the parsed data streams representing delayed optical signals, e.g. $Q_x$, $I_y$, and $Q_y$, are time-shifted using the known delay values of the optical delays associated with those signals. These delays may be (i) fixed pre-determined values, and/or (ii) temperature calibrated delay values of fiber delay paths, or (iii) obtained through markers inserted into the signal or LO optical fields at the switching stage, or (iv) obtained through digital correlation of the parsed data streams after detection. In a fourth step computing device 290 may then realign $I_x$, $Q_x$, $I_y$, and $Q_y$ data representative of a same single captured waveform based on both an integer number of time sample delays and a fraction of time sample delays through known digital interpolation or Fourier-transform based time shifting techniques. Finally, in a fifth step the four re-aligned signal streams are interpreted as $I_x$, $Q_x$, $I_y$, and $Q_y$ complex signal components as the output of the measurement setup. Note that some of the described steps may in some embodiments be performed in another order, or may be partially or wholly overlap in time.

Embodiments of the realigning operation are now described in additional detail, in which three example methods are presented. In a first method pilot pulses are inserted into the gated signal, e.g. such as the pilot 226 described previously. These pilot pulses can be inserted into the signal or the LO path and can be at the wavelength of the signal, of the LO, or at an entirely unrelated wavelength. The temporal width of these pilots is chosen to be small enough to allow for reliable temporal pulse position estimation after detection but large enough to be captured by multiple sampling points. For example, pulse widths may be on the order of 3 to 10 digital samples. Using known digital signal processing techniques, the processor 290 then estimates the center of the pilot pulse within each of the N bursts and realigns the signal based on a best-fit overlap of the N realigned pilot pulses.

A second method for burst re-alignment uses the data signal itself. Owing to the fact that the captured signal bears not only the coherent beat term between optical signal field and LO, but also one or more direct-detection terms, there is some amount of correlation between the bursts that can be used for re-alignment purposes. In a nonlimiting example, a single-polarization 90-degree optical hybrid produces the following signals at its two outputs after photodetection:

$$I=P_{Signal}(t)+P_{LO}+2\cdot Re\{E_{Signal}(t)\cdot E_{LO}^*\}$$

$$Q=P_{Signal}(t)+P_{LO}+2\cdot Im\{E_{Signal}(t)\cdot E_{LO}^*\}$$

where $P_{Signal}(t)$ is the time-varying optical signal power (also referred to as the direct detection term for this receiver structure), $P_{LO}$ is the (typically temporally constant) optical LO power, $2\cdot Re\{E_{signal}(t)\cdot E_{LO}^*\}$ is the in-phase component of the beat signal, and $2\cdot Im\{E_{Signal}(t)\cdot E_{LO}^*\}$ is the quadrature phase component of the beat signal. As the optical signal power is common to both photocurrents (hence to both bursts in the described temporally switched scheme), the direct-detection part of the signal lends itself to cross-correlation measurement between the bursts based on which temporal offset information can be extracted (by methods such as those known by those skilled in the pertinent art). Another example is the 3×3 optical hybrid, whose three output signals are described in Xie, et al., "Colorless coherent receiver using 3×3 coupler hybrids and single-ended detection," Optics Express, Vol. 20 Issue 2, pp. 1164-1171 (2012), incorporated herein by reference in its entirety. These three outputs also have direct-detection (optical signal power) terms that make them suitable for burst cross-correlation, and hence time re-alignment functions.

A third temporal re-alignment method uses pre-calibrated time delays that are measured during a factory or user calibration process using optical pulses as alignment signals. The respective time delays may be stored in look-up tables as a function of fiber delay-line temperature and signal wavelength and may then be applied during the temporal re-alignment process based on the respective operating conditions.

The re-alignment process itself may take place in two steps. A first, coarse, re-alignment may be performed based on a shift of the bursts by an integer amount of samples. A second, fine, re-alignment may use fractional-sample time shifts as implemented by, e.g., temporal interpolation with time-shifted re-sampling. Alternatively a Fourier transform may be performed, applying a time shift Δt in the frequency domain through multiplication by $\exp(j2\pi f\Delta t)$, and then performing a back-transformation to the time domain. Other standard digital time shifting techniques may be used as well as known to someone skilled in the art.

Yet another method of temporal re-alignment may be implemented as follows. Let c denote the measured (real-valued) amplitude of the waveform. And let L denote the approximate distance between two bursts (in number of samples). Then the accurate rearrangement of the two bursts can be done by calculating the cross correlation between the two bursts, where the second burst is captured by varying the starting point from L−l to L+l with a certain margin l. Mathematically, the accurate distance L* (measured in number of samples) can be calculated as:

$$L^* = \mathrm{argmax}_{L-l \leq k \leq L+l} \{c[n:n+N-1] \times c[n+k:n+N-1+k]^T\},$$

where N is the length of a captured waveform.

In order to enhance the robustness to the channel noise, one can also average the cross correlations, e.g. as:

$$L^* = \mathrm{argmax}_{L-l \leq k \leq L+l} \left\{ \sum_{n'=n, n+x, n+2x, \ldots} c[n':n'+N-1] \times c[n'+k:n'+N-1+k]^T \right\}.$$

Figure 4:
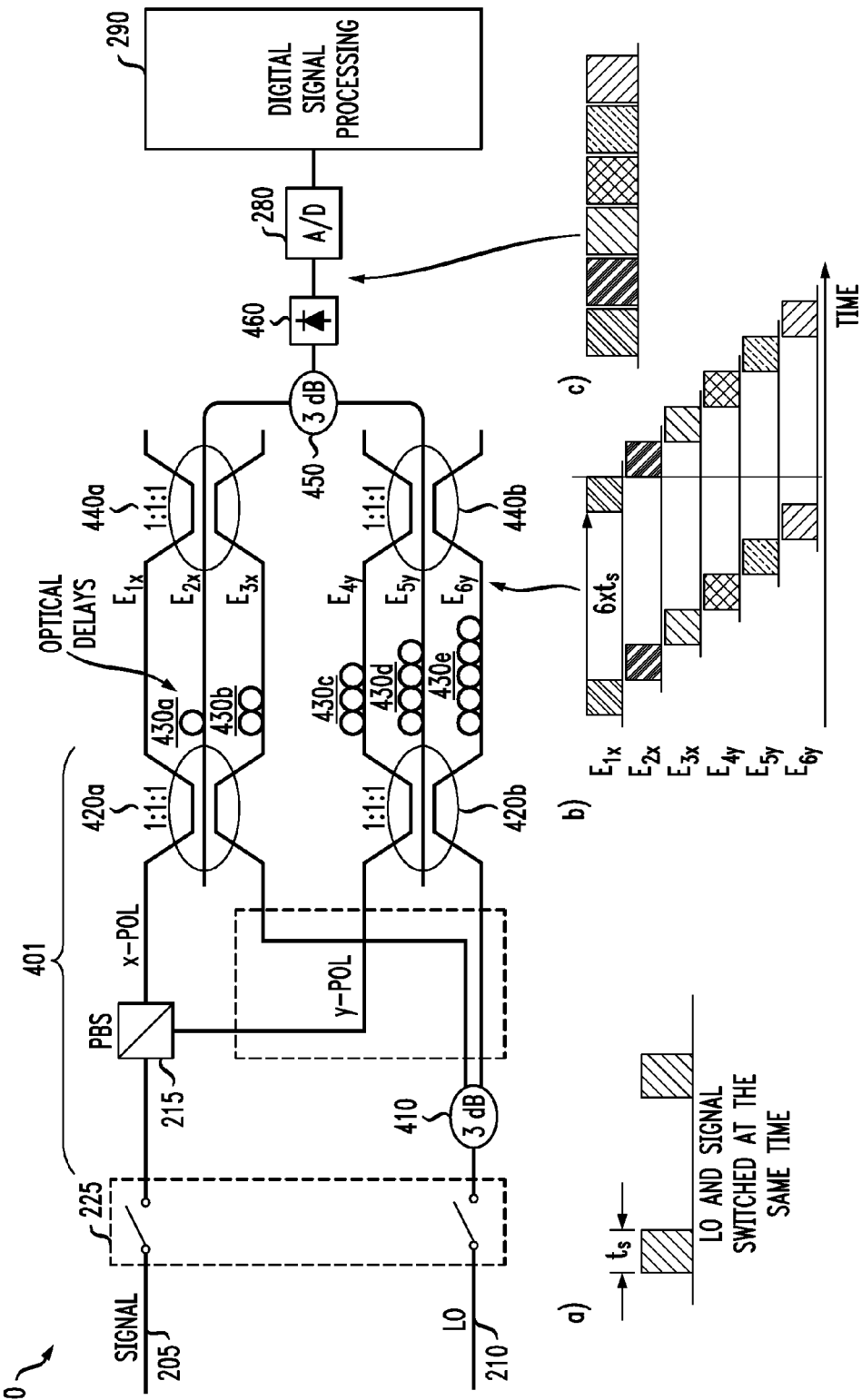
FIG. 4 illustrates an embodiment of a coherent receiver consistent with the disclosure that uses 3×3 couplers and a single ended photodiode.

FIG. 4 illustrates yet another embodiment of an optical receiver, here designated 400. The receiver 400 includes an optical front end 401 that includes the PBS 215 and a 3 dB splitter 410. The hybrids 230 are replaced with a first pair 420 of 3×3 hybrid couplers and a second pair 440 of 3×3 hybrid couplers. The received signal corresponding to one polarization, e.g. x-polarization, propagates via an upper branch including the hybrid couplers 420a and 440a. The received signal corresponding to the other polarization, e.g. y-polarization, propagates via a lower branch including the hybrid couplers 420b and 440b. The signals from the two branches are combined via a combiner 450. Conversion of the combined signal is achieved using a single-ended detector 460. For additional information regarding the hybrid couplers, see, e.g., Xie, supra, and U.S. Pat. No. 8,849,130, incorporated herein by reference in its entirety. Optical delays 430, e.g. fiber delay lines, are located between the hybrids 420 and the hybrids 440.

The receiver 400 includes the gating switches 225 previously described (see FIG. 2). In other embodiments, not shown, switches may instead be placed between the hybrid couplers 420 and the optical delays 430 or between the optical delays 430 and the output couplers 440. The switches 225 gate the received signal 205 and the LO for duration $t_s$ with a period of about $6t_s$ as illustrated in inset a. In the illustrated embodiment, six signals are output by the two 3×3 couplers, denoted $E_{1x}$, $E_{2x}$, $E_{3x}$, $E_{4y}$, $E_{5y}$ and $E_{6y}$. Thus six different delays may be used to transform the parallel signals at the outputs of the hybrid couplers 420 to a serial signal. The first path between the hybrid coupler 420a and the combiner 450 has no (zero) delay, neglecting inherent delays in the optical path. The second path between the hybrid coupler 420a and the combiner 450 has a delay $t_s$, and so on to the third path between the hybrid coupler 420b and the combiner 450, which has a delay of $5t_s$. The resulting sequence of delayed signals at the outputs of the delay lines is illustrated by inset b. Similar to the embodiment of FIGS. 2 and 3, the delayed signal bursts are temporally sequenced with a period of about $6t_s$. However, different from the previous embodiments, the bursts associated with the y-polarization channel follow the bursts associated with the x-polarization channel. Thus, after conversion to the electrical domain by a detector 460, e.g. single-ended photodiode, the three bursts from the top and bottom branches are serially arranged in the signal input to the A/D converter. (See inset c.)

Contrary to an alternative implementation which may use six detectors and A/D converters, in the illustrated embodiment only a single instance of the (single-ended) detector 460 is used, instead of a balanced detector pair for each 3×3 coupler output. The single-ended detector 460 may be available at higher speeds than is typically available in the balanced detector configuration. Furthermore, the direct-detection component of the beat signal can be easily processed out using this scheme, as described in Xie, supra.

Figure 5:
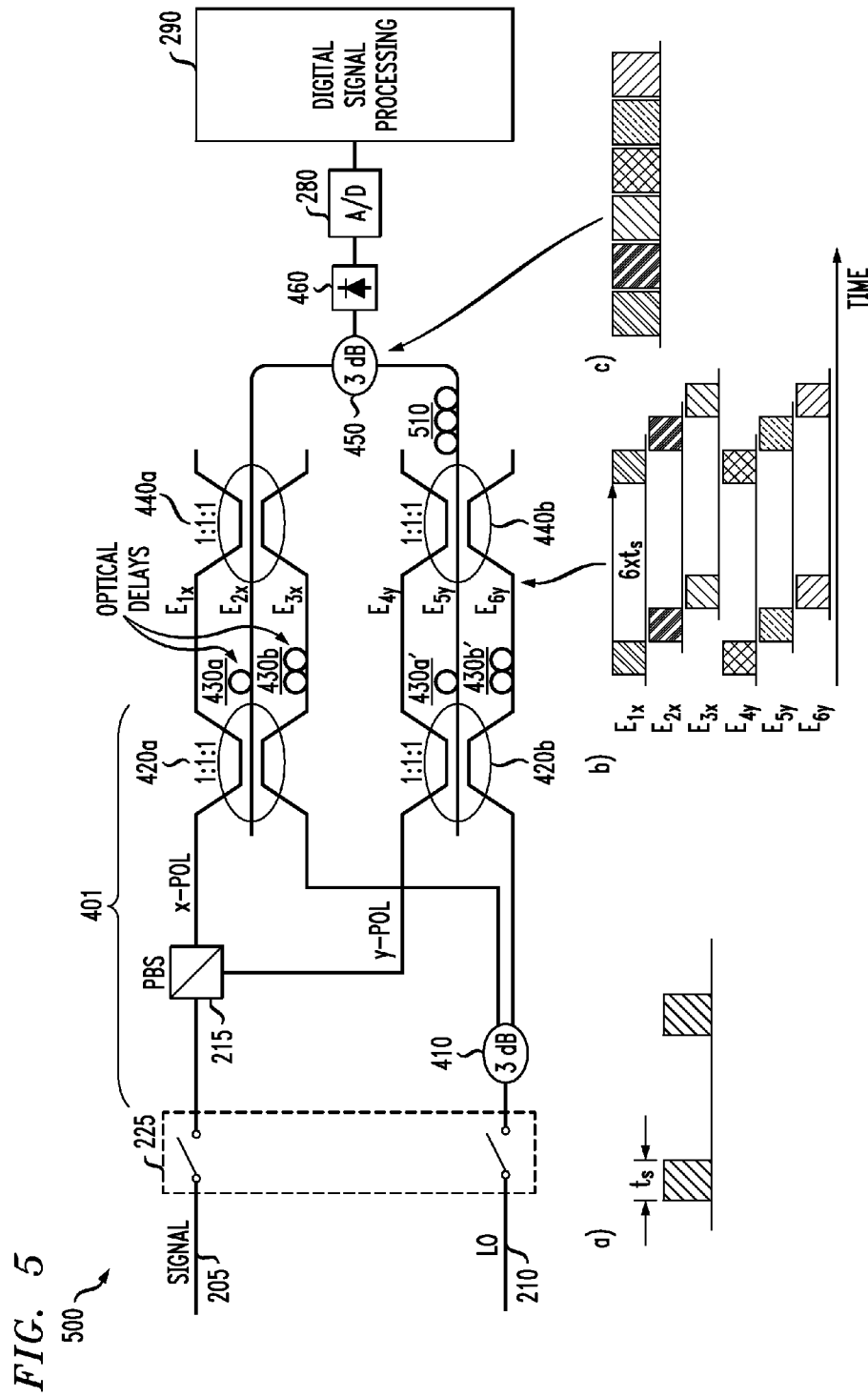
FIG. 5 illustrates another embodiment of a coherent receiver consistent with the disclosure that uses 3×3 couplers and a single ended photodiode.

FIG. 5 presents another embodiment similar to that of FIG. 4, designated receiver 500. In FIG. 5, the $E_{1x}$ signal is not delayed, while the $E_{2x}$ and $E_{3x}$ signals are respectively delayed $t_s$ and $2t_s$ by the delay lines 430a and 430b. Similarly the $E_{1y}$ signal is not delayed, while the $E_{2y}$ and $E_{3y}$ signals are respectively delayed $t_s$ and $2t_s$ and by delay lines 430a' and 430b'. Thus, as illustrated at inset b, two overlapping sequences of bursts result at the inputs to the hybrid couplers 440a and 440b. A delay line 510 is located between the hybrid coupler 440b and the combiner 450, thereby delaying the combined burst sequence associated with the y-polarization channel by $3t_s$. When the x-polarization and y-polarization channels are combined, the signal input to the A/D converter 280 includes the sequential bursts as described with respect to the receiver 400. Note that while the illustrated embodiment of the receiver 500, having polarization diversity, uses N=6 bursts, similar architectures having a single-polarization architecture may use only three bursts.

One potential advantage of the configuration of the receiver 500 is a net reduction of delay line needed to implement the optical delays in the y-polarization channel. Another potential advantage of this configuration is more precise control of the delays of the y-polarization channel signals, since all the intermediate signals $E_{4y}$, $E_{5y}$, and $E_{6y}$ are delayed by the same delay line 510 following the hybrid coupler 440b.

Figure 6:
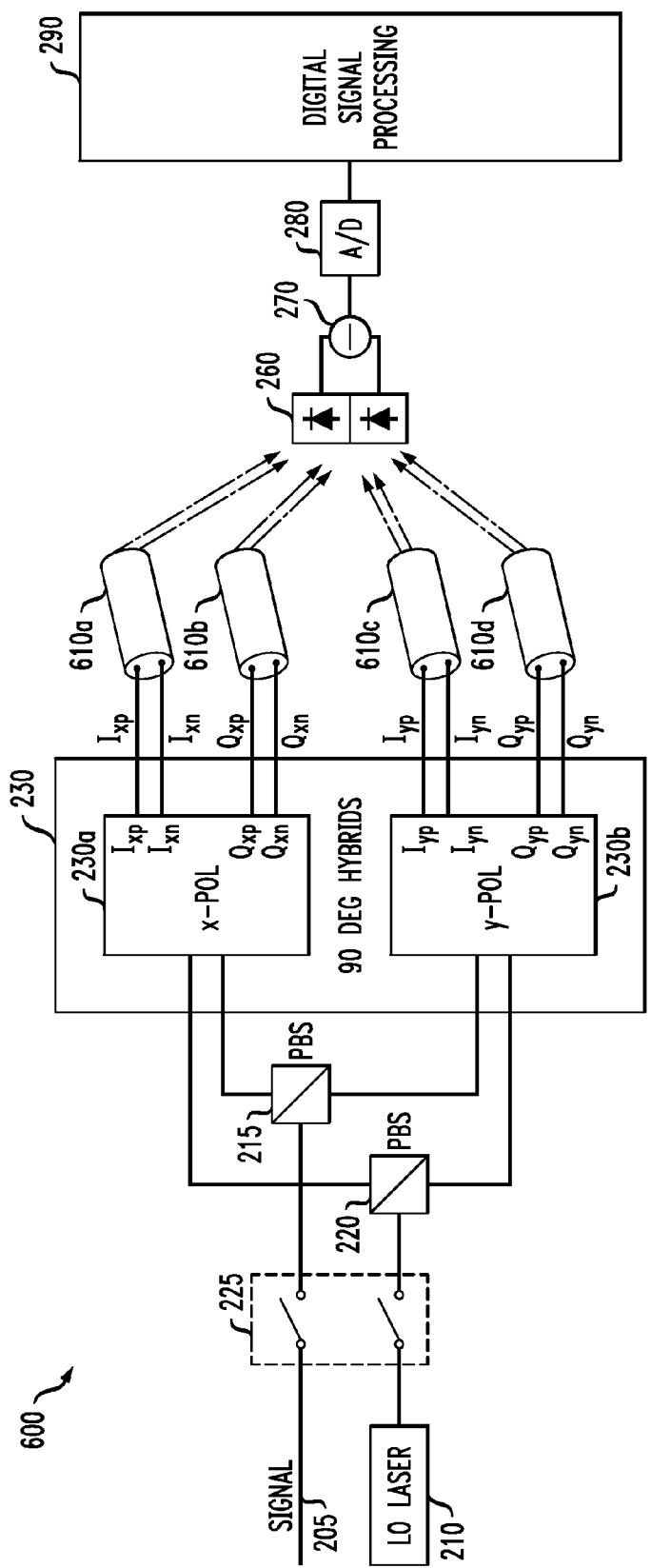
FIG. 6 illustrates an embodiment consistent with the disclosure that uses multicore fibers, e.g. having two cores, to propagate corresponding outputs of an optical hybrid, e.g. the hybrid of FIG. 3, to balanced detectors.

FIG. 6 presents another receiver embodiment, designated 600, which employs the optical hybrids 230. The outputs of hybrids 230 are directed to the balanced detectors 260 in pairs via a corresponding multicore optical fiber 610, e.g. two-core fibers. More specifically, pairs of corresponding outputs such as $I_{sp}/I_{xn}$, $Q_{xp}/Q_{xn}$, $I_{yp}/I_{yn}$ and $Q_{yp}/Q_{yn}$, are directed to the detectors 260 together via such multicore fibers. The lengths of the fibers 610 are determined to result in a delay of the associated signal pair as described previously, e.g. with respect to FIG. 2. Thus, the fiber 610a may have a delay of $\delta t$, the fiber 610a may have a delay of about $\delta t + t_s$ the fiber 610b may have a delay of about $\delta t + 2t_s$ and the fiber 610c may have a delay of $\delta t + 3t_s$. The signals from one core from each fiber may be combined to be detected by the detector 260a, and the signals from the other core from each fiber may be combined to be detected by the detector 260b. Conversion and processing of the resulting signals may be performed as previously described. Such embodiments may be beneficial to alleviate two potential issues, 1) similar timing, and 2) similar signal impairment. When using balanced detection, signals are typically received in pairs. In such cases it is generally desirable that the path lengths of each signal of the pair are equal. Cores in a multicore fiber are essentially path-matched. Thus the path delay is expected to be nearly identical for each pair of corresponding signals, e.g. $I_{xp}$ and $L_{xn}$. This may be advantageous to provide that both signals experience substantially identical signal path delays, impairments, and/or temperature dependencies, which is further advantageous for providing good fidelity of the detected signal from the balanced detector.

Figure 7:
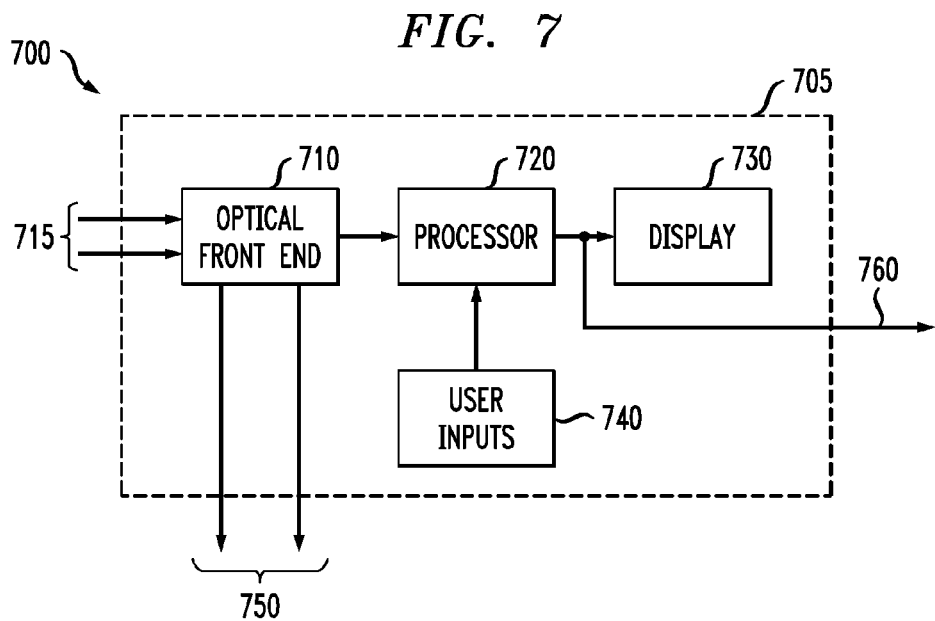
FIG. 7 illustrates an embodiment of an optical oscilloscope configured according to various embodiments.

FIG. 7 presents a schematic figure of an optical oscilloscope 700 configured according to various embodiments. The oscilloscope 700 may be used to characterize high-speed optical data streams in a similar manner to electronic oscilloscopes that provide visualization of features of a received signal. The oscilloscope 700 includes an optical front end and a processor 720. The optical front end 710 receives one or more received optical signals 715, and is consistent with embodiments described herein, e.g. the optical front end 401 or the optical front end 701. The front end 710 may include optical components, e.g. splitters, to provide pass-through of the received signals 715 to output optical signals 750. The oscilloscope 700 further includes a processor 720 and a display 730. The processor 720 may be consistent with various embodiments already described, e.g. including the A/D converter 280 and the processor 290. The processor 720 may receive user inputs 740 as described further below. The processor 720 may also make processed signals 760 available to external devices for additional processing and/or viewing.

The oscilloscope 700 may be embodied by a standalone assembly or may be a more modular design. For example, the front end 710, processor 720 and display 730 may be assembled and collocated in a housing 705 and configured to resemble a conventional electronic oscilloscope. In other embodiments, these components may be realized in a distributed fashion, e.g. a "virtual machine", with dedicated hardware or configurable devices. For example, the optical front end 710 in some embodiments may be implemented as a modular unit that includes all optical components that precede the processor 720 in the received signal flow. The processor 720 may be implemented as a dedicated computing device optimized for the described functionality, or may be general-purpose computing device programmed to implement this functionality, e.g. a digital signal processor (DSP). Similarly, the display may be a standalone display, may be a component of a console or portable computer, or of a handheld computing device or smart phone, or may be a dedicated hand-held device. The user inputs 740 may be implemented in any convenient form, such as a keyboard, keypad, touch screen or voice command. In some embodiments the oscilloscope 700 may be packaged for field use, e.g. by a service technician at an optical transmission node site.

The oscilloscope 700 may provide advantages over other possible configurations of such a device, e.g. due to reduced optical component count and/or reduced cost of components used. For example, by chopping the received signal and providing a serial data stream to the A/D converter 280, each of the receivers 200-600 reduce the number of detectors and A/D converters that would be expected in an architecture based on parallel transmission of the I/Q components from the 90 degree hybrid or coupler hybrid.

Figure 8:
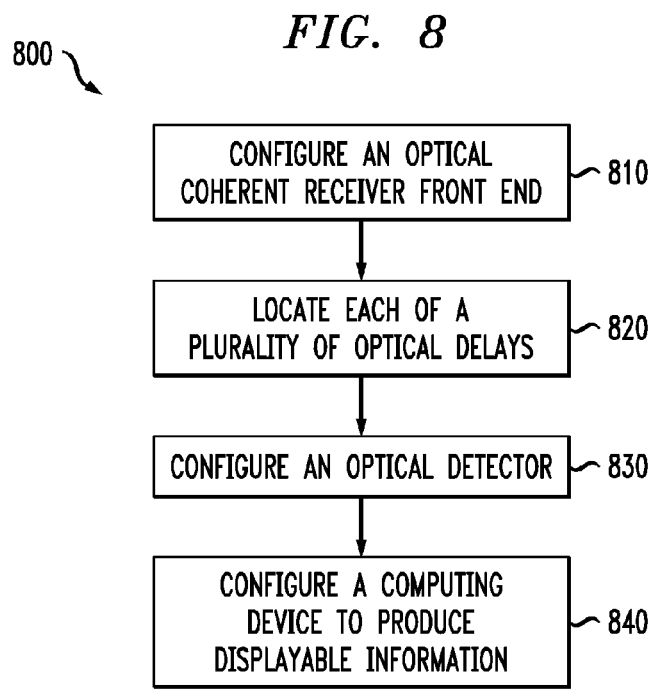
FIG. 8 illustrates an embodiment of a method, e.g. of manufacturing an apparatus consistent with various embodiments described herein.

FIG. 8 illustrates a method 800, e.g. for manufacturing an optical receiver according to described embodiments. The illustrated steps may be performed in another order than the illustrated order. Moreover, additional steps may be performed to realize various described embodiments. In a step 810 an optical coherent receiver front end is configured to accept a received signal component and a local oscillator component and to output optical signals containing in-phase and quadrature information of the received signal component. In a step 820 each of a plurality of optical delays is located in an optical path of a corresponding one of the output optical signals between the optical hybrid and an optical combiner. In a step 830 an optical detector is configured to receive an optical output from the optical combiner and produce therefrom an analog-electrical signal representative of the optical signal in the electrical domain. In a step 840 a computing device is configured to produce displayable graphic information representative of the received optical signal.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they formally fall within the scope of the claims.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, in conjunction with the appropriate computer hardware, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. An apparatus, comprising:
an optical receiver front end configured to receive at least one input optical signal and produce by an optical device at least first and second output optical signals, and to gate said at least one input optical signal or said at least first and second output optical signals;
an optical combiner configured to combine said at least first and second output optical signals;
an optical delay located in an optical path of said first optical output signal between said optical receiver front end and said optical combiner; and
an optical detector configured to receive a combined optical signal from said optical combiner and to produce therefrom an analog-electrical signal representative of the combined optical signal.

2. The apparatus of claim 1, wherein the optical device comprises an optical hybrid configured to receive said at least one input optical signal and at least a second optical signal, wherein said optical hybrid is configured to provide, via said first output optical signal, in-phase information of said input optical signal, and to provide, via said second output optical signal, quadrature information of said at least one input optical signal.

3. The apparatus of claim 2, wherein said optical delay is configured to delay one of said in-phase information and said quadrature information relative to the other of said in-phase information and said quadrature information, and further comprising a computing device configured to temporally align a digital-electrical representation of said in-phase and quadrature information before computing characteristics of said received at least one optical signal therefrom.

4. The apparatus of claim 3, wherein said computing device is further configured to align said in-phase and quadrature information using a pilot signal in said digital-electrical representation.

5. The apparatus of claim 3, wherein said computing device is further configured to align said in-phase and quadrature information by correlating direct detection terms in said in-phase and quadrature information.

6. The apparatus of claim 3, wherein said computing device is further configured to align said in-phase and quadrature information by performing a Fourier transform of said in-phase and quadrature information and performing a time shift in the frequency domain.

7. The apparatus of claim 1, further comprising an optical switch configured to sample said at least one optical input signal during a predetermined sample window.

8. The apparatus of claim 1, further comprising an optical switch located in said optical path between the optical device and said optical combiner.

9. The apparatus of claim 8, wherein said optical switch is located between an output of said optical device and said optical delay.

10. The apparatus of claim 8, wherein said optical switch is located between said optical delay and said optical combiner.

11. The apparatus of claim 1, wherein said optical delay comprises an optical fiber delay line.

12. The apparatus of claim 1, wherein said optical front end, optical delay and optical combiner are configured to produce a time-division multiplexed representation of a series of samples of in-phase and quadrature information of said received input signal, and a computing device is configured to temporally realign in-phase and quadrature information corresponding to same ones of said samples.

13. The apparatus of claim 1, wherein said optical delay is one of a pair of optical cores of a multicore fiber, wherein each pair of cores is configured to propagate a pair of corresponding outputs from said optical front end.

14. The apparatus of claim 1, wherein said optical delay is one of a plurality of optical delays located between corresponding outputs of said optical device and said optical combiner, and said optical delay has a corresponding delay time that differs from others of the plurality of optical delays by about an integer multiple of a delay time difference.

15. The apparatus of claim 2, wherein said optical hybrid is implemented as a 3×3 coupler hybrid.

16. A method, comprising:
configuring an optical receiver front end to accept at least one input optical signal and produce by an optical device at least first and second output optical signals, and to gate said at least one input optical signal or said at least first and second output optical signals;

locating an optical delay in an optical path of said first optical output signal between said optical receiver front end and an optical combiner; and configuring an optical detector to receive a combined optical signal from said optical combiner to produce therefrom an analog-electrical signal representative of said combined optical signal.

17. The method of claim 16, wherein the optical receiver front end comprises an optical hybrid configured to receive said at least one input optical signal and at least a second optical signal, and wherein said optical hybrid is configured to provide, via said first output optical signal, in-phase information of said input optical signal, and to provide, via said second output optical signal, quadrature information of said at least one input optical signal.

18. The method of claim 17, wherein said optical delay is configured to delay one of said in-phase information and said quadrature information relative to the other of said in-phase information and said quadrature information, and further comprising configuring a computing device to temporally align a digital-electrical representation of said in-phase and quadrature information before computing characteristics of said received at least one optical signal therefrom.

19. The method of claim 18, further comprising configuring said computing device to align said in-phase and quadrature information using a pilot signal in said digital-electrical representation.

20. The method of claim 16, further comprising locating said optical switch in said optical path between said optical device and said optical combiner.

* * * * *